United States Patent [19]

Kubo

[11] Patent Number: 4,840,396

[45] Date of Patent: Jun. 20, 1989

[54] REAR SUSPENSION SYSTEM FOR AUTOMOBILES

[75] Inventor: Kanji Kubo, Saitama, Japan

[73] Assignee: Honda Giken Kogyo Kabushiki Kaisha, Tokyo, Japan

[21] Appl. No.: 123,870

[22] Filed: Nov. 23, 1987

[30] Foreign Application Priority Data

Dec. 9, 1986 [JP] Japan .................. 61-292985

[51] Int. Cl.$^4$ .................................. B60G 3/00
[52] U.S. Cl. ..................... 280/690; 280/701
[58] Field of Search ............. 280/668, 688, 690, 701

[56] References Cited

U.S. PATENT DOCUMENTS 4,471,974  9/1984  Kosnk et al. ............ 280/690
4,671,531  6/1987  Soutter et al. ........... 280/688

FOREIGN PATENT DOCUMENTS 2038880  7/1970  Fed. Rep. of Germany .
60-53408  3/1985  Japan .
234011  11/1985  Japan ................... 280/690
232909  10/1986  Japan ................... 280/668
2176159  12/1986  United Kingdom ....... 280/690

Primary Examiner—Charles A. Marmor
Assistant Examiner—Ross Weaver
Attorney, Agent, or Firm—Nixon & Vanderhye

[57] ABSTRACT

A rear suspension system for automobiles, comprising: a trailing arm pivoted to the automobile body at its front end and to a knuckle at its rear end; a first and a second lateral links extending laterally across an upper portion and a lower portion of the knuckle and the corresponding locations of the automobile body, respectively; and a third lateral link extending laterally across an intermediate position of the knuckle, located between the upper portion and the lower portion of the knuckle and behind a central axial line of a wheel axle of the knuckle, and the corresponding location of the automobile body. The second lateral link has a substantially same length as the third lateral link. Thus, the mounting positions of the lower end of the shock absorber can be lowered, and the resistance against the changes in the toe angle and the camber angle is increased. If the first lateral link is shorter than the second lateral link, the camber angle of the outer wheel of a vehicle making a turn can become negative so as to improve the cornering limit of the automobile.

7 Claims, 3 Drawing Sheets

REAR SUSPENSION SYSTEM FOR AUTOMOBILES

BACKGROUND OF THE INVENTION

The present invention relates to a rear suspension system for automobiles and in particular to such a rear suspension system which has a high compliance along the longitudinal direction of the vehicle body or, in other words, in the fore-and-aft direction of the automobile body and yet restricts the change in the toe angle of the wheel as it travels vertically.

The fore-and-aft compliance of a wheel is desired to be high for better capability of the wheel to roll over irregular road surfaces and for improved ride comfort of the automobile, but a high fore-and-aft compliance of a wheel tends to cause an instability in the toe angle of the wheel. The stability of the toe angle is essential for lateral stability of the automobile. As a matter of fact, if the toe angle of the wheel changes as the wheel undergoes a vertical motion the oversteer or understeer tendency of the automobile accordingly changes and this is disadvantageous in terms of the handling of the automobile. A high fore-and-aft compliance of a wheel may also cause an instability in the camber angle of the wheel and it should be likewise controlled. The ability of the wheel to resist the changes in the toe angle and the camber angle are referred to, hereinafter, as the toe angle rigidity and the camber angle rigidity, respectively. Thus, not only the toe angle rigidity of the wheel but also the camber angle rigidity of the wheel are desired to be as high as possible.

Rear suspension systems for automobiles using a trailing arm and three lateral links are disclosed, for instance, in Japanese patent laid-open publication Nos. 60-53408 and DE-OS 2038880. The suspension system of this type offers much freedom in various design parameters and permits a good control of the toe angle and the camber angle by appropriately arranging the lateral links and determining their lengths. However, these conventional rear suspension systems do not necessarily offer a high compliance of the wheel along the fore-and-aft direction. Furthermore, a shock absorber element including at least a damper or a spring is required to be connected to an upper arm or the knuckle itself which supports the wheel and the compactness of the suspension system is impaired with the shock absorber element extending above the suspension system into the space for a passenger compartment or a trunk. This is due to the fact that there is no lower arm which is located exactly below the axle to connect the lower end of the shock absorber element.

BRIEF SUMMARY OF THE INVENTION

The present invention is intended as an improvement of such conventional rear suspension systems.

Specifically, a primary object of the present invention is to provide an improved rear suspension system for automobiles using a trailing arm and lateral links in which the fore-and-aft compliance of the wheel is increased and the rigidity of the toe angle and/or the camber angle of the wheel can be increased.

Another object of the present invention is to provide an improved rear suspension system for automobiles in which the camber angle is allowed to change so as to increase the cornering limit of the automobile.

Yet another object of the present invention is to provide an improved rear suspension system for automobiles which is highly compact.

BRIEF SUMMARY OF THE INVENTION

According to the present invention, such an object can be accomplished by providing a rear suspension system for automobiles, comprising: a trailing arm which extends substantially along a fore-and-aft direction of an automobile body and is pivoted to the automobile body at its front end; a wheel support member connected to a rear end of the trailing arm in a laterally moveable manner relative thereto; a first lateral link extending laterally between an upper portion of the wheel support member and the automobile body substantially along a horizontal direction; a second lateral link extending laterally between a lower portion of the wheel support member and the automobile body substantially along a horizontal direction; and a third lateral link extending laterally between an intermediate position of the wheel support member, located between the upper portion and the lower portion of the wheel support member and behind a central axial line of a wheel axle of the wheel support member, and the automobile body substantially along a horizontal direction; the second lateral link having a substantially same length as the third lateral link.

Since the second link and the third link are of a substantially same length, the change in the toe angle is controlled. Since the point of attachment of the third link to the wheel support member is placed far away from those for the first and the second links, the rigidity of the toe angle is increased. Since the first link and the second link are provided at diagonally opposed positions relative to each other, the rigidity of the camber angle is increased.

In particular, by making the first link shorter than the second link, the camber angle is allowed to become negative when the wheel is in an upper part of its vertical traveling stroke and the cornering limit of the automobile is improved.

According to a preferred embodiment of the present invention, the first lateral link extends laterally substantially exactly below a central axial line of the wheel axle of the wheel support member. Thus, the lower link can be attached to a very low position of the wheel support member and the points of attachment for the damper and the suspension spring can be lowered accordingly.

The trailing arm may be provided with a damper which permits a damped longitudinal extending motion of the trailing arm. Preferably, the trailing arm extends substantially horizontally and the rear end of the trailing arm is pivoted to the wheel support member by way of a pivot pin which is slightly forwardly inclined from a vertical direction. This arrangement permits a desired freedom and compliance to the motion of the wheel support member.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
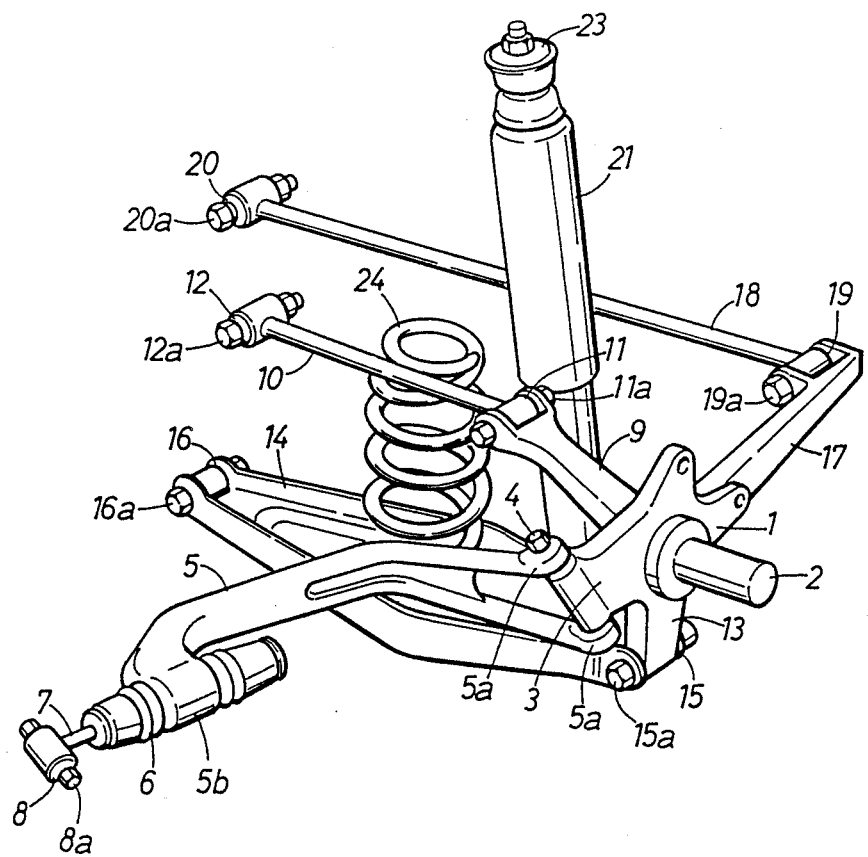
FIG. 1 is a perspective view of the rear suspension system according to the present invention.
Figure 2:
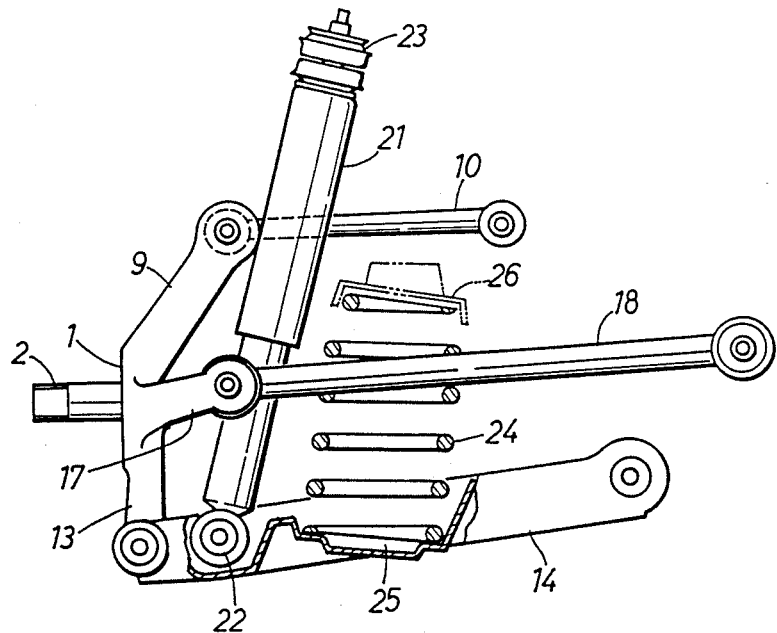
FIG. 2 is a rear view of the suspension system shown in FIG. 1.
Figure 3:
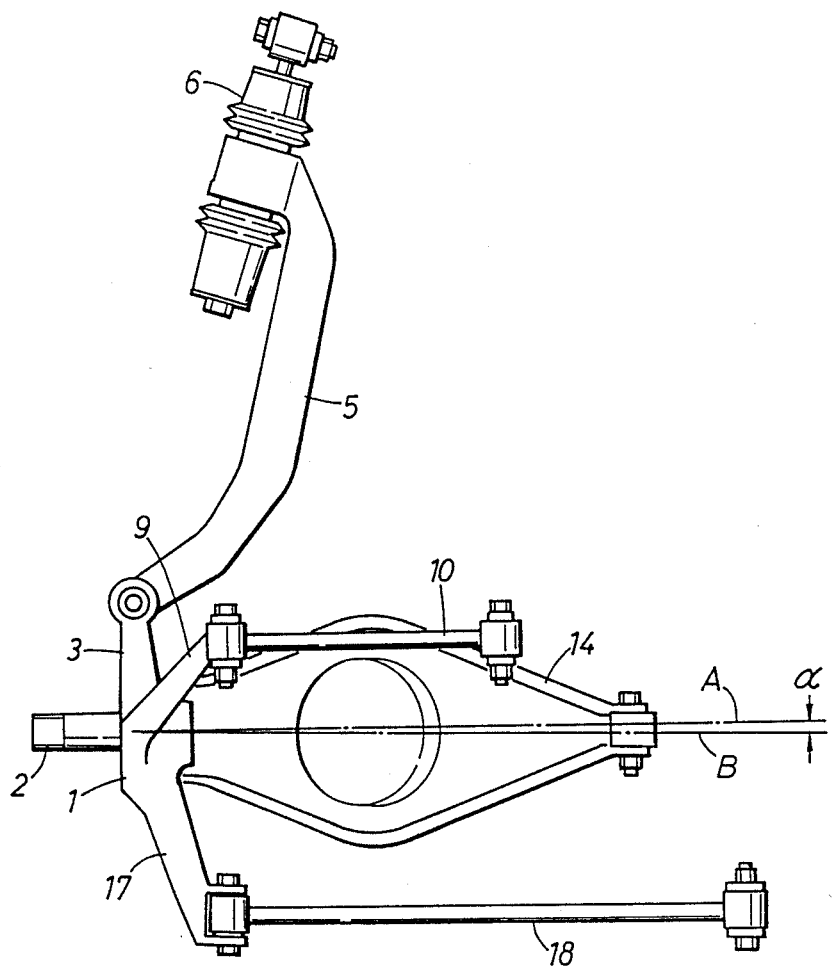
FIG. 3 is a plan view of the suspension system shown in FIG. 1.

FIGS. 1 to 3 show an embodiment of the rear suspension system for automobiles according to the present invention. The wheel support member or the knuckle 1 is integrally provided with a spindle 2 which projects outwardly from a central part thereof and supports a wheel not shown in the drawings in a freely rotatable manner. Although this knuckle is designed for a non-driven wheel, the present invention is equally applicable to a suspension system for a driven wheel. The front, the rear, the upper and the lower ends of the knuckle 1 are provided with arms 3, 17, 9 and 13, respectively, which project radially away from a central axial line of the spindle 2. The upper arm 9 and the rear arm 17 are slightly inclined toward the center of the automobile.

The front arm 3 of the knuckle 1 is pivotally connected to bifurcated rear end 5a of a trailing arm 5 which extends in a substantially horizontal plane by way of a substantially vertical but slightly forwardly inclined pivot pin 4 which is passed through the bifurcated rear ends 5a of the trailing arm 5 and the free end of the front arm 3. As best shown in FIG. 1, the free end of the front arm 3 is received between the bifurcated rear ends 5a of the trailing arm 5. The trailing arm 5 is slightly curved inwardly at its middle part as seen in plan view (FIG. 3) to avoid an interference with the wheel and its front end 5b is connected to a sleeve end of a damper 6. The other end or the piston rod end of the damper 6 is pivoted to the automobile body by way of a piston rod 7, a rubber bush 8 and a pivot pin 8a which extends in a horizontal plane and slightly inclines to the right in a horizontal plane.

The upper arm 9 of the knuckle 1 is connected to the automobile body by way of a first lateral link 10 and the two ends of the lateral link 10 are pivoted to the automobile body and the knuckle 1 by way of rubber bushes 11 and 12 and pivot pins 11a and 12a, respectively, the pivot pins 11a and 12a extending along the fore-and-aft direction of the automobile (the pivot pins 11a and 12a may be slightly inclined downwardly, or, in other words, its front end down, depending on the circumstance). The lower arm 13 of the knuckle 1 is connected to the automobile body by way of a second lateral link 14 which is relatively flat and is made wider in its middle part. The two ends of the second lateral link 14 are pivoted to the automobile body and the knuckle 1 by way of rubber bushes 15 and 16 and pivot pins 15a and 16a, respectively, the pivot pins 15a and 16a likewise extending along the fore-and-aft direction of the automobile.

The rear arm 17 of the knuckle 1 is connected to the automobile body by way of a third lateral link 18. The two ends of the third lateral link 18 are pivoted to the automobile body and the knuckle 1 by way of rubber bushes 19 and 20 and pivot pins 19a and 20a, respectively, the pivot pins 19a and 20a likewise extending along the fore-and-aft direction of the automobile.

As best shown in FIG. 2, a middle part of the second lateral link 14 which is slightly closer to the knuckle 1 is connected to the lower end of a damper 21 by way of a rubber bush 22 while the other end or the upper end of the damper 21 is connected to the automobile body, likewise, by way of a rubber bush 23. Another middle part of the second lateral link 14 slightly closer to the automobile body is provided with a spring retainer 25 for receiving the lower end of a suspension spring 24 therein while the upper end of this suspension spring 24 is attached to the automobile body by way of a similar spring retainer 26.

As shown in FIG. 3, the central axial line A of the rear axle of the automobile and the central axial line B of the second lateral link 14, when drawn from a common central point in the spindle 2, form a small angle alpha. Or, in other words, the central axial line B of the second parallel link 14 extends from the automobile body laterally outwardly and slightly forwardly in a horizontal plane while the central axial line A of the wheel axle extends outwardly exactly laterally from the automobile body. This is for obtaining an advantage in the mechanical strength and the rigidity of the suspension system by aligning the axial line of the second lateral link 14 with the direction of the action of the force resulting from the combination of the side force acting upon the inner wheel as the automobile makes a turn and the rolling resistance of the wheel. In FIG. 3, the damper 21 and the suspension spring 24 are omitted.

According to this structure of the present embodiment, since the trailing arm 5 is connected to the automobile body by way of the damper 6, it is possible to increase the compliance of the knuckle 1 in the fore-and-aft direction to a desired extent. Furthermore, since the third lateral link 18 is placed far away from the first lateral link 10 and the second lateral link 14, the rigidity of the toe angle can be increased. Additionally, by setting the lengths of the second lateral link 14 and the third lateral link 18 substantially equal to each other, the change in the toe angle is controlled.

Since the second lateral link 14 is provided in the lower end of the knuckle 1, the mounting positions of the the damper 21 and the suspension spring 24 can be lowered and this is advantageous in assuring a large space to the passenger compartment or to the trunk space of the automobile. That the first lateral link 10 is arranged diagonally opposite to the second lateral link 14 contributes to the increase in the camber rigidity. Since the first lateral link 14 is shorter than the second lateral link 10, the camber angle can become negative when the wheel is at an upper position in its vertical traveling stroke with the result that the cornering limit of the automobile is increased and the running performance of the automobile is improved.

According to the present invention, since the fore-and-aft compliance of the wheel can be increased and the toe angle rigidity and the camber angle rigidity are both increased while the camber angle is allowed to become negative when the wheel comes closer to the automobile body in its vertical traveling stroke, a substantial advantage will be obtained in improving the riding comfort and the running performance of an automobile.

What we claim is:

1. A rear suspension system for automobiles comprising:
   a trailing arm which extends substantially along a fore-and-aft direction of an automobile body and is pivoted to the automobile body at its front end;
   a wheel support member connected to a rear end of the trailing arm in a laterally moveable manner relative thereto;
   a first lateral link extending laterally between an upper portion of the wheel support member and the automobile body substantially along a horizontal direction;

a second lateral link extending laterally between a lower portion of the wheel support member and the automobile body substantially along a horizontal direction; and a third lateral link extending laterally between an intermediate position of the wheel support member, located between the upper portion and the lower portion of the wheel support member and behind a central axial line of a wheel axle of the wheel support member, and the automobile body substantially along a horizontal direction;

the second lateral link having a substantially same length as the third lateral link wherein the trailing arm extends substantially horizontally and the rear end of the trailing arm is pivoted to the wheel support member by way of a pivot pin which is slightly forwardly inclined from a vertical direction.

2. A rear suspension system for automobiles as defined in claim 1, wherein the first lateral link is shorter than the second lateral link.

3. A rear suspension system for automobiles as defined in claim 1, wherein the second lateral link supports an end of a spring element.

4. A rear suspension system for automobiles as defined in claim 1, wherein the second lateral link supports an end of a damper element.

5. A rear suspension system for automobiles as defined in claim 1, wherein the trailing arm is provided with a damper which permits a damped longitudinal extending motion of the trailing arm.

6. A rear suspension system for automobiles as defined in claim 1, wherein a middle part of the trailing arm is curved inwardly to avoid an interference with a wheel.

7. A rear suspension system for automobiles as defined in claim 1, a central axial line of the second link extends from the automobile body laterally outwardly and slightly forwardly in a horizontal plane.

* * * * *